United States Patent
Guha et al.

(10) Patent No.: US 7,210,005 B2
(45) Date of Patent: Apr. 24, 2007

(54) METHOD AND APPARATUS FOR POWER-EFFICIENT HIGH-CAPACITY SCALABLE STORAGE SYSTEM

(75) Inventors: Aloke Guha, Louisville, CO (US); Christopher T. Santilli, Colorado Springs, CO (US); Gary B. McMillian, Austin, TX (US)

(73) Assignee: COPAN Systems, Inc., Longmont, CO (US)

( * ) Notice: Subject to any disclaimer, the term of this patent is extended or adjusted under 35 U.S.C. 154(b) by 0 days.

(21) Appl. No.: 11/351,979

(22) Filed: Feb. 9, 2006

(65) Prior Publication Data
US 2006/0129761 A1 Jun. 15, 2006

Related U.S. Application Data

(63) Continuation of application No. 10/607,932, filed on Jun. 26, 2003, now Pat. No. 7,035,972.

(60) Provisional application No. 60/407,299, filed on Sep. 3, 2002.

(51) Int. Cl.
*G06F 12/00* (2006.01)

(52) U.S. Cl. ............. 711/114; 711/111; 711/112; 711/154; 711/170; 713/300; 713/320; 713/324; 714/6

(58) Field of Classification Search ............... 711/114, 711/112, 111, 154, 170; 713/300, 320, 324; 714/6

See application file for complete search history.

(56) References Cited

U.S. PATENT DOCUMENTS

| 5,088,081 | A | * | 2/1992 | Farr | 369/47.14 |
|---|---|---|---|---|---|
| 5,530,658 | A | * | 6/1996 | Hafner et al. | 703/6 |
| 5,666,538 | A | * | 9/1997 | DeNicola | 713/320 |
| 5,680,579 | A | * | 10/1997 | Young et al. | 711/157 |
| 5,787,462 | A | * | 7/1998 | Hafner et al. | 711/114 |
| 5,961,613 | A | * | 10/1999 | DeNicola | 710/18 |
| 2002/0007464 | A1 | * | 1/2002 | Fung | 713/320 |
| 2002/0062454 | A1 | * | 5/2002 | Fung | 713/300 |
| 2002/0144057 | A1 | * | 10/2002 | Li et al. | 711/112 |
| 2003/0196126 | A1 | * | 10/2003 | Fung | 713/300 |
| 2003/0200473 | A1 | * | 10/2003 | Fung | 713/320 |
| 2005/0177755 | A1 | * | 8/2005 | Fung | 713/300 |

OTHER PUBLICATIONS

Intl Search Report dated Mar. 12, 2004 issued in corresponding international application No. PCT/US03/20214.*

(Continued)

*Primary Examiner*—Stephen C. Elmore
(74) *Attorney, Agent, or Firm*—Brian N. Young; Trellis Intellecutal Property Law Group, PC

(57) ABSTRACT

Systems and methods for providing scalable, reliable, power-efficient, high-capacity data storage, wherein large numbers of closely packed data drives having corresponding metadata and parity volumes are individually powered on and off, depending upon their respective usage. In one embodiment, the invention is implemented in a RAID-type data storage system which employs a large number of hard disk drives that are individually controlled, so that only the disk drives that are in use are powered on. The reduced power consumption allows the disk drives to be contained in a smaller enclosure than would conventionally be possible. In a preferred embodiment, the data protection scheme is designed to utilize large, contiguous blocks of space on the data disk drives, and to use the space on one data disk drive at a time, so that the data disk drives which are not in use can be powered down.

39 Claims, 16 Drawing Sheets

OTHER PUBLICATIONS

Asaca/Shibasoku Corp of America, publication "DM 200," 1 page, from www.asaca.com/DVL/DM$_{13}$ 200.htm, Oct. 7, 2003.*

Colarelli et al., "The Cas for Masive Arrays of Idle Disks (MAID)," Dept of Computer Science, Univ. of Colorado, Boulder, pp 1-6, Jan. 7, 2002.*

Patterson et al., "A Case for Redundant Arrays of Inexpensive Disks (RAID),"ACM, pp 109-116, 1998.*

Chase et al., "Managing Energy and Server Resources in Hosting Centers," Dept of Computer Science, Duke University, pp 14, Oct. 2001.*

* cited by examiner

| MDV attribute data
(membership, state, shelf identifier) |
|---|
| Disk attribute data
(vendor, serial number, state, RAIDset membership) |
| RAIDset attribute data
(RAIDset UUID, state, RAIDset membership, capacity, Volume UUID) |
| Volume attribute data
(Volume UUID, state, rights, owners, capacity, RAIDset UUID) |
| Volume 0
(Volume UUID, write cache (512MB), read cache(512MB), bad block table (256MB)) |
| Volume 1
(Volume UUID, write cache (512MB), read cache(512MB), bad block table (256MB)) |
| • • • |
| Volume n
(Volume UUID, write cache (512MB), read cache(512MB), bad block table (256MB)) |

Fig. 7

METHOD AND APPARATUS FOR POWER-EFFICIENT HIGH-CAPACITY SCALABLE STORAGE SYSTEM

RELATED APPLICATIONS

This application is a continuation of U.S. patent application Ser. No. 10/607,932, entitled "METHOD AND APPARATUS FOR POWER-EFFICIENT HIGH-CAPACITY SCALABE STORAGE SYSTEM", filed Jun. 26, 2003, now U.S. Pat. No. 7,035,972, which claims priority to U.S. Provisional Patent Application No. 60/407,299, entitled "Method and Apparatus for Efficient Scalable Storage Management", filed Sep. 3, 2002, both of which are incorporated by reference as if set forth herein in its entirety.

BACKGROUND OF THE INVENTION

1. Field of the Invention

The present invention relates generally to data storage systems, and more particularly to power-efficient, high-capacity data storage systems that are scalable and reliable.

2. Related Art

The need for large data storage motivates the need for building large-scale and high-capacity storage systems. While one option for building scalable systems is to connect and centrally manage multiple storage systems across a network, such as a storage area network (SAN), the inherent capacity increase in a single system is still highly desirable for two reasons: first, increasing total storage capacity in a single system in effect provide a multiplier effect for the total storage across a SAN; and second, for many uses providing a single device that manages larger capacity of storage is always more cost-effective in testing, integrating and deploying.

Traditionally, tape drives, automated tape libraries or other removable media storage devices have been used to deliver large capacity storage in a single system. This is due in large part to the lower cost and footprint of these types of systems when compared to media such as disk drives. Recent advances in disk technology, however, have caused designers to revisit the design of large scale storage systems using disk drives. There are two primary reasons for this. First, the cost differential between disk and tape devices on per unit storage is decreasing rapidly due to the higher capacity of disk drives available at effectively lower cost. Second, the performance of disk systems with respect to access times and throughput are far greater than tape systems.

Despite the falling cost of disk drives and their performance in throughput and access times, some tape drives still have the advantage of being able to support large numbers (e.g., ten or more) of removable cartridges in a single automated library. Because a single tape drive can access multiple tape volumes, equivalent storage on multiple disk drives will consume ore (e.g., ten times more) power than the equivalent tape drive systems, even with a comparable footprint. Furthermore, for a disk-based storage system that has the same number of powered drives as the number of passive cartridges in a tape system, the probability of failures increases in the disk storage system. It would therefore be desirable to provide a single high-capacity disk based storage system that is as cost effective as tertiary tape storage systems but with high reliability and greater performance.

Traditional RAID and Data Protection Schemes Issues

The dominant approach to building large storage systems is to use a redundant array of inexpensive (independent) disks (RAID). RAID systems are described, for example, in David A. Patterson, G. Gibson, and Randy H. Katz, "A Case for Redundant Arrays of Inexpensive Disks (RAID)," International Conference on Management of Data (SIGMOD), p. 109–116, June 1988. The primary goal for RAID is to provide data protection or fault tolerance in access to data in the case of failures, especially disk failures. A secondary benefit is increasing I/O performance by spreading data over multiple disk spindles and performing operations in parallel, which allows multiple drives to be working on a single transfer request.

There are six commonly known RAID "levels" or standard geometries that are generally used for conventional RAID storage systems. The simplest array that provides a form of redundancy, a RAID level 1 system, comprises one or more disks for storing data and an equal number of additional mirror disks for storing copies of the information written to the data disks. The remaining RAID levels, identified as RAID level 2–6 systems, segment the data into portions for storage across several data disks. One of more additional disks is utilized to store error check or parity information.

RAID storage subsystems typically utilize a control module that shields the user or host system from the details of managing the redundant array. The controller makes the subsystem appear to the host computer as a single, highly reliable, high capacity disk drive even though a RAID controller may distribute the data across many smaller drives. Frequently, RAID subsystems provide large cache memory structures to further improve the performance of the subsystem. The host system simply requests blocks of data to be read or written and the RAID controller manipulates the disk array and cache memory as required.

The various RAID levels are distinguished by their relative performance capabilities as well as their overhead storage requirements. For example, a RAID level 1 "mirrored," storage system requires more overhead storage than RAID levels 2–5 that utilize XOR parity to provide requisite redundancy. RAID level 1 requires 100% overhead since it duplicates all data, while RAID level 5 requires 1/N of the storage capacity used for storing data, where N is the number of data disk drives used in the RAID set.

Traditional Power Consumption Issues

There have been a few recent efforts at power cycling computing resources at a data center. This is done for a variety of different reasons, such as energy cost and reliability. For example, a data storage system may be scaled upward to incorporate a very large number of disk drives. As the number of disk drives in the system increases, it is apparent that the amount of energy required to operate the system increases. It may be somewhat less apparent that the reliability of the system is likely to decrease because of the increased heat generated by the disk drives in the system. While prior art systems use various approaches to address these problems, they typically involve opportunistically powering down all of the drives in the system, as demonstrated by the following examples.

To reduce energy costs in a data center, one approach employs energy-conscious provisioning of servers by concentrating request loads to a minimal active set of servers for the current aggregate load level (see Jeffrey S. Chase, Darrell C. Anderson, Parchi N. Thakar, Amin M. Vahdat, and Ronald P. Doyle. Managing energy and server resources in hosting centers. In *Proceedings of the* 18*th ACM Symposium* on *Operating Systems Principles*, pages 103–116, October 2001). Active servers always run near a configured utilization threshold, while the excess servers transition to low-power idle states to reduce the energy cost of maintaining surplus capacity during periods of light load. The focus is on power cycling servers and not on storage. Chase, et al. mention that power cycling may reduce the life of the disks, but current disks have a start/stop limit that will likely not be exceeded.

Another approach uses a large-capacity storage system which is referred to as a massive array of idle disks, or MAID (see Dennis Colarelli, Dirk Grunwald and Michael Neufeld, The Case for Massive Arrays of Idle Disks (MAID), Usenix Conference on File and Storage Technologies (FAST), January 2002, Monterey Calif.). In this approach, a block level storage system uses a front-end cache and controller that allow access to the full array of drives. The full array can be powered off opportunistically to extend the life of IDE or ATA drives. The power off schedule is based on a heuristic, such as a least-recently-used or least expected to be used model, i.e., the array of drives is turned off when no data access is expected on any of the drives in the array. Another approach uses archival storage systems where ATA drives are also powered off (as in the case of MAID) based on the algorithms similar to the LRU policy (see Kai Li and Howard Lee, Archival data storage system and method, U.S. Patent Application # 20020144057, Oct. 3, 2002). In some systems, the array of drives comprises a RAID set. In these systems, the entire RAID set is opportunistically powered on or off (see, e.g., Firefly™ Digital Virtual Library, http://www.asaca.com/DVL/DM 200.htm). opportunistically powered on or off (see, e.g., Firefly Digital Virtual Library, These systems can power down a RAID set that has been in an extended state of inactivity, or power up a RAID set for which I/O requests are pending.

Systems with Very Large Numbers of Drives

One of the challenges that exists in the current data storage environment is to build a storage controller that can handle hundreds of drives for providing large-scale storage capacity, while maintaining performance and reliability. This challenge encompasses several different aspects of the system design: the system reliability; the interconnection and switching scheme for control of the drives; the performance in terms of disk I/O; and the cost of the system. Each of these aspects is addressed briefly below.

System Reliability.

As the number of operational drives increases in the system, especially if many drives are seeking for data concurrently, the probability of a drive failure increases almost linearly with the number of drives, thereby decreasing overall reliability of the system. For example, if a typical disk drive can be characterized as having a mean time to failure (MTTF) of 500,000 hours, a system with 1000 of these drives will be expected to have its first disk fail in 500.5 hours or 21 days.

Interconnection and Switching Scheme for Control of Drives.

As the number of drives increases, an efficient interconnect scheme is required both to move data and to control commands between the controller and all of the drives. As used here, control of the drives refers to both controlling access to drives for I/O operations, and providing data protection, such as by using RAID parity schemes. There are two obvious challenges that arise in relation to the interconnection mechanism: the cost of the interconnection and the related complexity of fanout from the controller to the drives.

Performance for Disk I/O.

Since the controller will read and write data to and from all of the drives, the bandwidth required between the controller and the drives will scale With the number of active drives. In addition, there is the difficulty of RAIDing across a very large set, since the complexity, the extent of processing logic and the delay of the parity computation will grow with the number of drives in the RAID set.

Cost.

All of the above design issues must be addressed, while ensuring that the cost of the overall disk system can be competitive with typically lower cost tertiary tape storage devices.

SUMMARY OF THE INVENTION

One or more of the problems outlined above may be solved by the various embodiments of the invention. Broadly speaking, the invention comprises systems and methods for providing scalable, reliable, power-efficient, high-capacity data storage, wherein large numbers of closely packed data drives having corresponding metadata and parity volumes are individually powered on and off, according to usage requirements.

In one embodiment, the invention is implemented in a RAID-type data storage system. This system employs a large number of hard disk drives that are individually controlled, so that in this embodiment only the disk drives that are in use are powered on. Consequently, the system uses only a fraction of the power that would be consumed if all of the disk drives in the system had to be powered on. In a preferred embodiment, the data protection scheme is designed to utilize large, contiguous blocks of space on the data disk drives, and to use the space on one data disk drive at a time, so that the data disk drives which are not in use can be powered down.

One embodiment of the invention comprises a method which includes the steps of providing a data storage system having a plurality of data storage drives, performing data accesses to the data storage system, wherein the data accesses involve accesses to a first subset of the data storage drives and wherein the first subset of the data storage drives is powered on, and powering down a second subset of the data storage drives, wherein the data accesses do not involve accesses to the second subset of the data storage drives.

Numerous additional embodiments are also possible.

BRIEF DESCRIPTION OF THE DRAWINGS

Other objects and advantages of the invention may become apparent upon reading the following detailed description and upon reference to the accompanying drawings.

FIG. 7 is a diagram illustrating the structure of information stored on a metadata disk in accordance with one embodiment.

Figure 1:
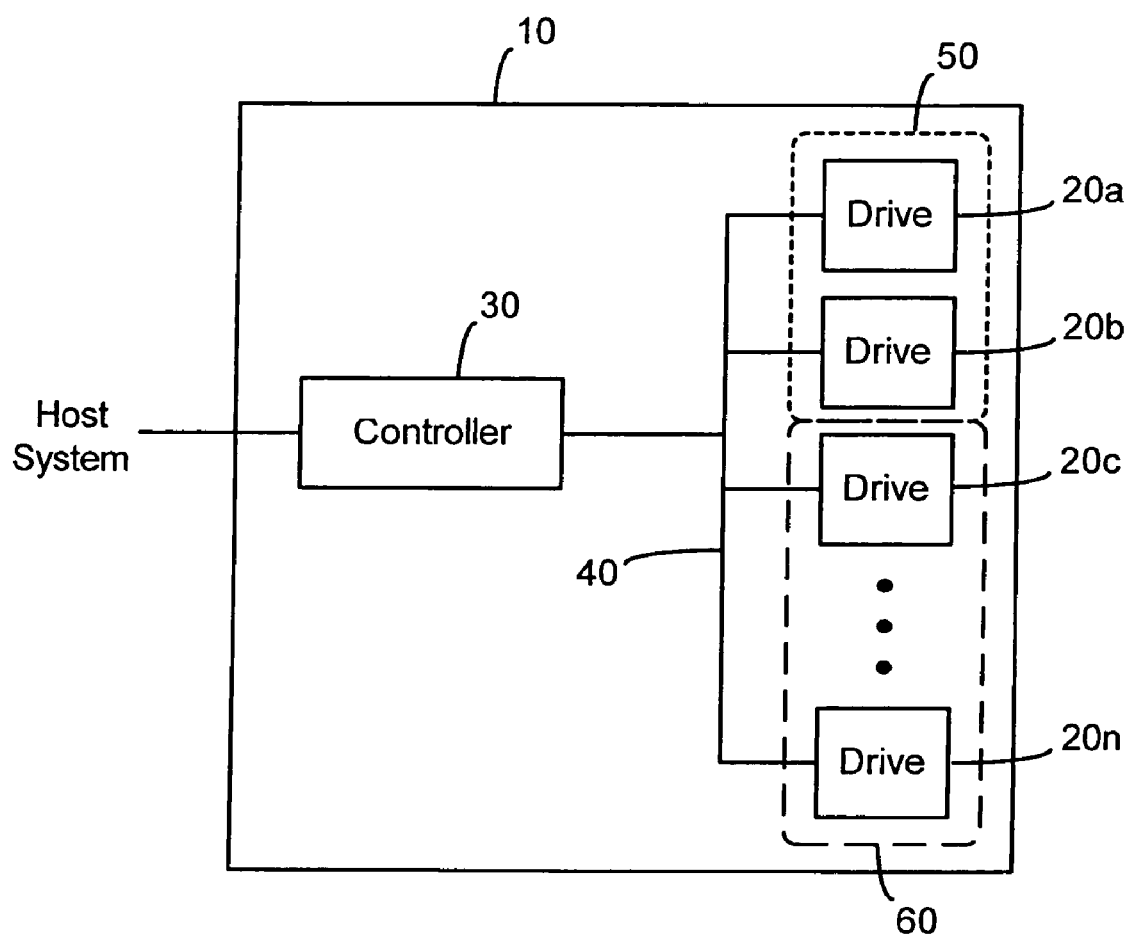
FIG. 1 is a diagram illustrating the general structure of a multiple-disk data storage system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing scalable, reliable, power-efficient, high-capacity data storage, wherein large numbers of closely packed data drives having corresponding data storage drives are individually powered on and off, depending upon their usage requirements.

In one embodiment, the invention is implemented in a RAID-type data storage system. This system employs a large number of hard disk drives. When data is written to the system, the data is written to one or more of the disk drives. Metadata and parity information corresponding to the data are also written to one or more of the disk drives to reduce the possibility of data being lost or corrupted. The manner in which data is written to the disks typically involves only one data disk at a time, in addition to metadata and parity disks. Similarly, reads of data typically only involve one data disk at a time. Consequently, data disks which are not currently being accessed can be powered down. The system is therefore configured to individually control the power to each of the disks so that it can power up the subset of disks that are currently being accessed, while powering down the subset of disks that are not being accessed.

Because only a portion of the disk drives in the system are powered on at any given time, the power consumption of the system is less than that of a comparable conventional system (i.e., one with approximately the same total number of similar disk drives) in which all of the disk drives have to be powered on at the same time. As a result of the lower power consumption of the system, it generates less heat and requires less cooling than the conventional system. The present system can therefore be packaged in a smaller enclosure than the comparable conventional system. Another difference between the present system and conventional systems is that conventional systems require switches for routing data to appropriate data disks in accordance with the data protection scheme employed by the system (e.g., RAID level 3). In the present system, on the other hand, most of the disk drives are powered down at any given time, so the data can be distributed by a simple fan-out interconnection, which consumes less power and takes up less volume within the system enclosure than the switches used in conventional systems. Yet another difference between the present system and conventional systems is that, given a particular reliability (e.g., mean time to failure, or MTTF) of the individual disk drives, the present system can be designed to meet a particular reliability level (e.g., threshold mean time between failures, MTBF), as opposed to conventional systems, which are essentially constrained by the number of disk drives in the system and the reliability of the individual disk drives.

The various embodiments of the invention may provide advantages over conventional systems (e.g., RAID systems) in the four areas discussed above: power management; data protection; physical packaging; and storage transaction performance. These advantages are described below with respect to the different areas of impact.

Power Management

In regard to power management, embodiments of the present invention may not only decrease power consumption, but also increase system reliability by optimally power cycling the drives. In other words, only a subset of the total number of drives is powered on at any time. Consequently, the overall system reliability can be designed to be above a certain acceptable threshold.

The power cycling of the drives on an individual basis is one feature that distinguishes the present embodiments from conventional systems. As noted above, prior art multi-drive systems do not allow individual drives, or even sets of drives to be powered off in a deterministic manner during operation of the system to conserve energy. Instead, they teach the powering off of entire systems opportunistically. In other words, if it is expected that the system will not be used at all, the entire system can be powered down. During the period in which the system is powered off, of course, it is not available for use. By powering off individual drives while other drives in the system remain powered on, embodiments of the present invention provide power-efficient systems for data storage and enable such features as the use of closely packed drives to achieve higher drive density than conventional systems in the same footprint.

Data Protection

In regard to data protection, it is desirable to provide a data protection scheme that assures efficiency in storage overhead used while allowing failed disks to be replaced without significant disruption during replacement. This scheme must be optimized with respect to the power cycling of drives since RAID schemes will have to work with the correct subset of drives that are powered on at any time. Thus, any Read or Write operations must be completed in expected time even when a fixed set of drives are powered on. Because embodiments of the present invention employ a data protection scheme that does not use most or all of the data disks simultaneously, the drives that are powered off can be easily replaced without significantly disrupting operations.

Physical Packaging

In regard to the physical packaging of the system, most storage devices must conform to a specific volumetric constraint. For example, there are dimensional and weight limits that correspond to a standard rack, and many customers may have to use systems that fall within these limits. The embodiments of the present invention use high density packing and interconnection of drives to optimize the physical organization of the drives and achieve the largest number of drives possible within these constraints.

Storage Transaction Performance

In regard to storage transaction performance, the power cycling of drives results in a limited number of drives being powered on at any time. This affects performance in two areas. First, the total I/O is bound by the number of powered drives. Second, a random Read operation to a block in a powered down drive would incur a very large penalty in the spin-up time. The embodiments of the present invention use large numbers of individual drives, so that the number of drives that are powered on, even though it will be only a fraction of the total number of drives, will allow the total I/O to be within specification. In regard to the spin-up delay, the data access scheme masks the delay so that the host system does not perceive the delay or experience a degradation in performance.

Figure 2A:
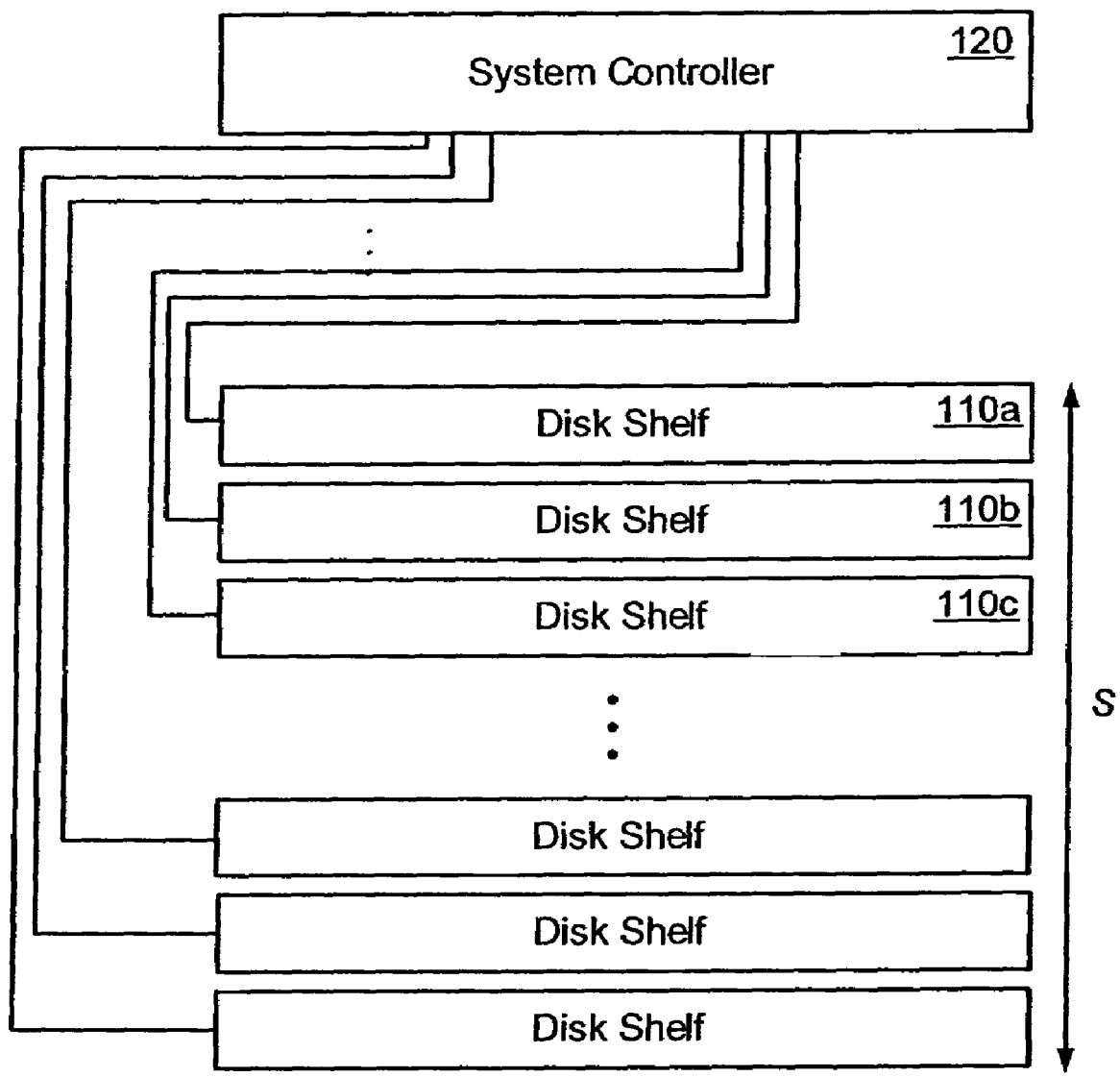
FIGS. 2A and 2B are diagrams illustrating the interconnections between the controllers and disk drives in a densely packed data storage system in accordance with one embodiment.
Figure 2B:
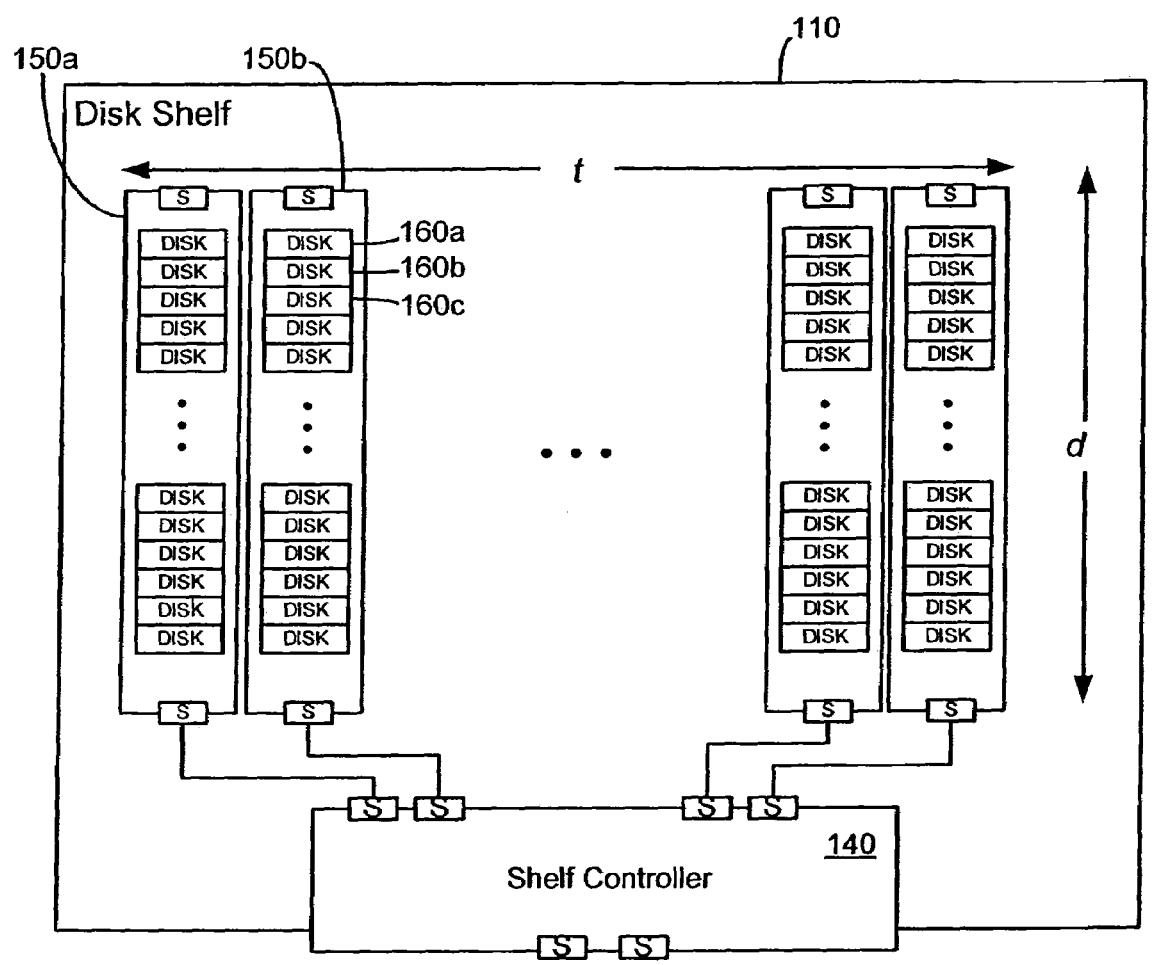

Referring to FIG. 1, a diagram illustrating the general structure of a multiple-disk data storage system in accordance with one embodiment of the invention is shown. It should be noted that the system illustrated in FIG. 1 is a very simplified structure which is intended merely to illustrate one aspect (power cycling) of an embodiment of the invention. A more detailed representation of a preferred embodiment is illustrated in FIGS. 2A and 2B and the accompanying text below.

As depicted in FIG. 1, data storage system 10 includes multiple disk drives 20. It should be noted that, for the purposes of this disclosure, identical items ir the figures may be indicated by identical reference numerals followed by a lowercase letter, e.g., 20a, 20b, and so on. The items may be collectively referred to herein simply by the reference numeral. Each of disk drives 20 is connected to a controller 30 via interconnect 40.

It can be seen in FIG. 1 that disk drives 20 are grouped into two subsets, 50 and 60. Subset 50 and subset 60 differ in that the disk drives in one of the subsets (e.g., 50) are powered on, while the disk drives in the other subset (e.g., 60) are powered down. The individual disk drives in the system are powered on (or powered up) only when needed. When they are not needed, they are powered off (powered down). Thus, the particular disk drives that make up each subset will change as required to enable data accesses (reads and writes) by one or more users. This is distinctive because, as noted above, conventional data storage (e.g., RAID) systems only provide power cycling of the entire set of disk drives—they do not allow the individual disk drives in the system to be powered up and down as needed.

As mentioned above, the system illustrated by FIG. 1 is used here simply to introduce the power cycling aspect of one embodiment of the invention. This and other embodiments described herein are exemplary and numerous variations on these embodiments may be possible. For example, while the embodiment of FIG. 1 utilizes multiple disk drives, other types of data storage, such as solid state memories, optical drives, or the like could also be used. It is also possible to use mixed media drives, although it is contemplated that this will not often be practical. References herein to disk drives or data storage drives should therefore be construed broadly to cover any type of data storage. Similarly, while the embodiment of FIG. 1 has two subsets of disk drives, one of which is powered on and one of which is powered off, other power states may also be possible. For instance, there may be various additional states of operation (e.g., standby) in which the disk drives may exist, each state having its own power consumption characteristics.

The powering of only a subset of the disk drives in the system enables the use of a greater number of drives within the same footprint as a system in which all of the drives are powered on at once. One embodiment of the invention therefore provides high density packing and interconnection of the disk drives. This system comprises a rack having multiple shelves, wherein each shelf contains multiple rows, or "sticks" of disk drives. The structure of this system is illustrated in FIGS. 2A and 2B.

Referring to FIGS. 2A and 2B, the top level interconnection between the system controller 120 and the shelves 110 is shown on the left side of the figure. The shelf-level interconnection to each of the sticks 150 of disk drives 160 is shown on the right side of the figure. As shown on the left side of the figure, the system has multiple shelves 110, each of which is connected to a system controller 120. Each shelf has a shelf controller 140 which is connected, to the sticks 150 in the shelf. Each stick 150 is likewise connected to each of the disk drives 160 so that they can be individually controlled, both in terms of the data accesses to the disk drives and the powering on/off of the disk drives. The mechanism for determining the optimal packing and interconnection configuration of the drives in the system is described below.

It should be noted that, for the sake of clarity, not all of the identical items in FIG. 2 are individually identified by reference numbers. For example, only a few of the disk shelves (110a–110c), sticks (150a–150b) and disk drives (160a–160c) are numbered. This is not intended to distinguish the items having reference numbers from the identical items that do not have reference numbers.

Let the number of drives in the system be N, where N is a large number.

N is then decomposed into a 3-tuple, such that N=s.t.d where s: number of shelf units in the system, typically determined by the physical height of the system. For example, for a 44U standard rack system, s can be chosen to be 8.

t: the number of "sticks" in the each shelf unit where a stick comprises a column of disks. For example, in a 24-inch-wide rack, t<=8.

d: the number of disk drives in each stick in a shelf. In a standard rack, d can be 14

Figure 3:
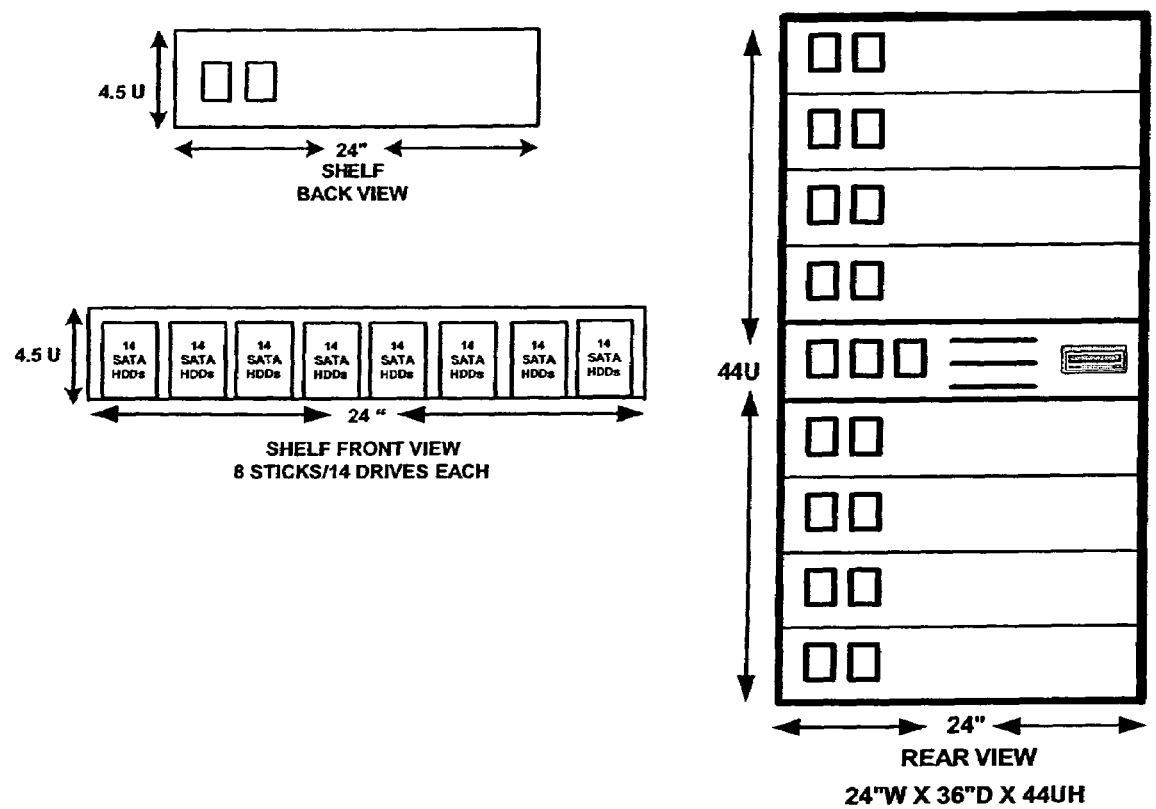
FIG. 3 is a diagram illustrating the physical configuration of a densely packed data storage system in accordance with one embodiment.

The configuration as shown in FIG. 2 is decomposed into shelves, sticks and disks so that the best close packing of disks can be achieved for purposes of maximum volumetric capacity of disk drives. One example of this is shown in FIG. 3. With the large racks that are available, nearly 1000 3.5" disks can be packed into the rack.

The preferred configuration is determined by the decomposition of N into s, t and d while optimizing with respect to the i) volume constraints of the drives and the overall system (the rack), and ii) the weight constraint of the complete system. The latter constraints are imposed by the physical size and weight limits of standard rack sizes in data centers.

Besides constraints on weight and dimensions, large-scale packing of drives must also provide adequate airflow and heat dissipation to enable the disks to operate below a specified ambient temperature. This thermal dissipation limit also affects how the disks are arranged within the system.

One specific implementation that maximizes the density of drives while providing sufficient air flow for heat dissipation is the configuration shown in FIG. 3.

Power Cycling of Drives to Increase System Reliability and Serviceability

One embodiment of the invention comprises a bulk storage or near-online (NOL) system. This storage system is a rack-level disk system comprising multiple shelves. Hosts can connect to the storage system via Fibre Channel ports on the system level rack controller, which interconnects to the shelves in the rack. Each shelf has a local controller that controls all of the drives in the shelf. RAID functionality is supported within each shelf with enough drives for providing redundancy for parity protection as well as disk spares for replacing failed drives.

In this embodiment, the system is power cycled. More particularly, the individual drives are powered on or off to improve the system reliability over the entire (large) set of drives. Given current known annualized failure rates (AFRs), a set of 1000 ATA drives would be expected to have a MTBF of about 20 days. In an enterprise environment, a drive replacement period of 20 days to service the storage system is not acceptable. The present scheme for power cycling the individual drives effectively extends the real life of the drives significantly. However, such power cycling requires significant optimization for a number of reasons. For example, power cycling results in many contact start-stops (CSSs), and increasing CSSs reduces the total life of the drive. Also, having fewer powered drives makes it difficult to spread data across a large RAID set. Consequently, it may be difficult to implement data protection at a level equivalent to RAID 5. Still further, the effective system bandwidth is reduced when there are few powered drives.

In one embodiment, the approach for determining the power cycling parameters is as shown in the flow diagram of FIG. 4 and as described below. It should be noted that the following description assumes that the disk drives have an exponential failure rate (i.e., the probability of failure is $1-e^{-\lambda t}$, where $\lambda$ is the inverse of the failure rate). The failure rates of disk drives (or other types of drives) in other embodiments may have failure rates that are more closely approximated by other mathematical functions. For such systems, the calculations described below would use the alternative failure function instead of the present exponential function.

With a large number of drives, N, that are closely packed into a single physical system, the MTTF of the system will grow significantly as N grows to large numbers.

If the MTTF of a single drive is f (typically in hours) where f=1/(failure rate of a drive) then the system MTBF, F, between failures of individual disks in the system is $$F=1/(1-(1-1/f)N)$$

For N=1000, and f=500,000 hrs or 57 years, F=22 days. Such low MTBF is not acceptable for most data centers and enterprises. As mentioned above, the system MTBF can be increased by powering the drives on and off, i.e., power cycling the drives, to increase the overall life of each drives in the system. This facilitates maintenance of the system, since serviceability of computing systems in the enterprise requires deterministic and scheduled service times when components (drives) can be repaired or replaced. Since it is desired to have scheduled service at regular intervals, this constraint is incorporated into the calculations that follow.

Let the interval to service the system to replace failed disk drives be T, and required the power cycling duty ratio be R.

The effective system MTBF is T, and the effective failure rate of the system is 1/T Then, the effective MTBF in a system of N disks is:

$$f^*=1/\{1-(1-1/T)^{1/N}\}$$

Thus, we can compute the effective MTTF of disks in a large number of drives in a single system so that the service interval is T.

Since the actual MTTF is f, the approach we take is to power cycle the drives, i.e., turn off the drives for a length of time and then turn them on for a certain length of time. If R is the duty ratio to meet the effective MTTF, then $$R=f/f^*<1$$

Thus, if the ON period of the drives is p hours, then the drives must be OFF for p/R hours.

Further, since at any one time only a subset of all drives are powered on, the effective number of drives in the system that are powered ON is R*N.

Thus, the ratio R of all drives at a shelf is also the number of drives that must be powered ON in total in each shelf. This also limits the number of drives that are used for data writing or reading as well as any other drives used for holding metadata.

There is one other constraint that must be satisfied in the power cycling that determines the ON period of p hours.

If the typical life of the drive is f hours (same as nominal MTTF), then the number of power cycling events for a drive is CSS (for contact start stops)

$$CSS=f/(p+p/R)$$

Since CSS is limited to a maximum CSSmax, for any drive $$CSS<CSSmax$$

Thus, p must be chosen such that CSSmax is never exceeded.

Figure 4:
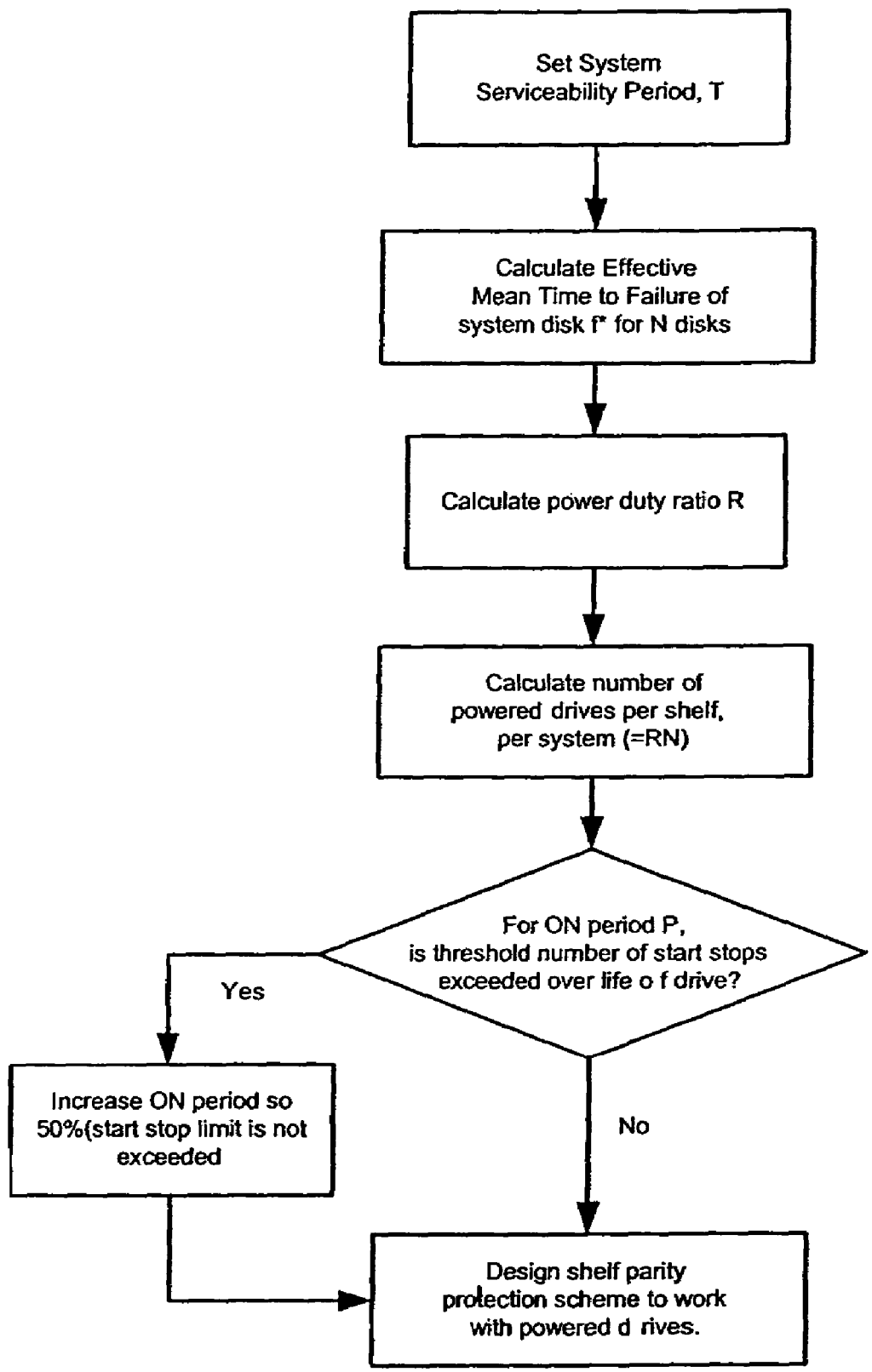
FIG. 4 is a flow diagram illustrating the manner in which the power management scheme of a densely packed data storage system is determined in accordance with one embodiment.

FIG. 4 depicts the flowchart for establishing power cycling parameters.

Efficient Data Protection Scheme for Near Online (NOL) System

In one embodiment, a new RAID variant is implemented in order to meet the needs of the present Power Managed system. To meet the serviceability requirement of the system, the power duty cycle R of the drives will be less than 100% and may be well below 50%. Consequently, when a data volume is written to a RAID volume in a shelf, all drives in the RAID set cannot be powered up (ON). The RAID variant disclosed herein is designed to provide the following features.

First, this scheme is designed to provide adequate parity protection. Further, it is designed to ensure that CSS thresholds imposed by serviceability needs are not violated. Further, the RAID striping parameters are designed to meet the needs of the workload patterns, the bandwidth to be supported at the rack level, and access time. The time to access the first byte must also be much better than tape or sequential media. The scheme is also designed to provide parity based data protection and disk sparing with low overhead.

There are a number of problems that have to be addressed in the data protection scheme. For instance, failure of a disk during a write (because of the increased probability of a disk failure due to the large number of drives in the system) can lead to an I/O transaction not being completed. Means to ensure data integrity and avoid loss of data during a write should therefore be designed into the scheme. Further, data protection requires RAID redundancy or parity protection. RAID operations, however, normally require all drives powered ON since data and parity are written on multiple drives. Further, Using RAID protection and disk sparing typically leads to high disk space overhead that potentially reduces effective capacity. Still further, power cycling increases the number of contact start stops (CSSs), so CSS failure rates increase, possibly by 4 times or more.

In one embodiment, there are 3 types of drives in each shelf: data and parity drives that are power cycled per schedule or by read/write activity; spare drives that are used to migrate data in the event of drive failures; and metadata drives that maintain the state and configuration of any given RAID set. A metadata drive contains metadata for all I/O operations and disk drive operational transitions (power up, power down, sparing, etc.). The data that resides on this volume is organized such that it provides information on the data on the set of disk drives, and also caches data that is to be written or read from drives that are not yet powered on. Thus, the metadata volume plays an important role in disk management, I/O performance, and fault tolerance.

The RAID variant used in the present system "serializes" writes to smallest subset of disks in the RAID set, while ensuring that CSS limits are not exceeded and that the write I/O performance does not suffer in access time and data rate.

Approach to RAID Variant

In applying data protection techniques, there are multiple states in which the set of drives and the data can reside. In one embodiment, the following states are used. Initialize—in this state, a volume has been allocated, but no data has been written to the corresponding disks, except for possible file metadata. Normal—in this state, a volume has valid data residing within the corresponding set of disk drives. This includes volumes for which I/O operations have resulted in the transferring of data. Data redundancy—in this state, a volume has been previously degraded and is in the process of restoring data redundancy throughout the volume. Sparing—in this state, a disk drive within a set is replaced.

Assumptions

When developing techniques for data protection, there are tradeoffs that have to be made based on the technique that is selected. Two assumptions are made when considering tradeoffs. The first assumption is that this data storage system is not to achieve or approach the I/O performance of an enterprise online storage system. In other words, the system is not designed for high I/O transactions, but for reliability. The second assumption is that the I/O workload usage for this data storage is typically large sequential writes and medium to large sequential reads.

Set of Disk Drives Initialized

An initialized set of disk drives consists of a mapped organization of data in which a single disk drive failure will not result in a loss of data. For this technique, all disk drives are initialized to a value of 0.

Figure 5:
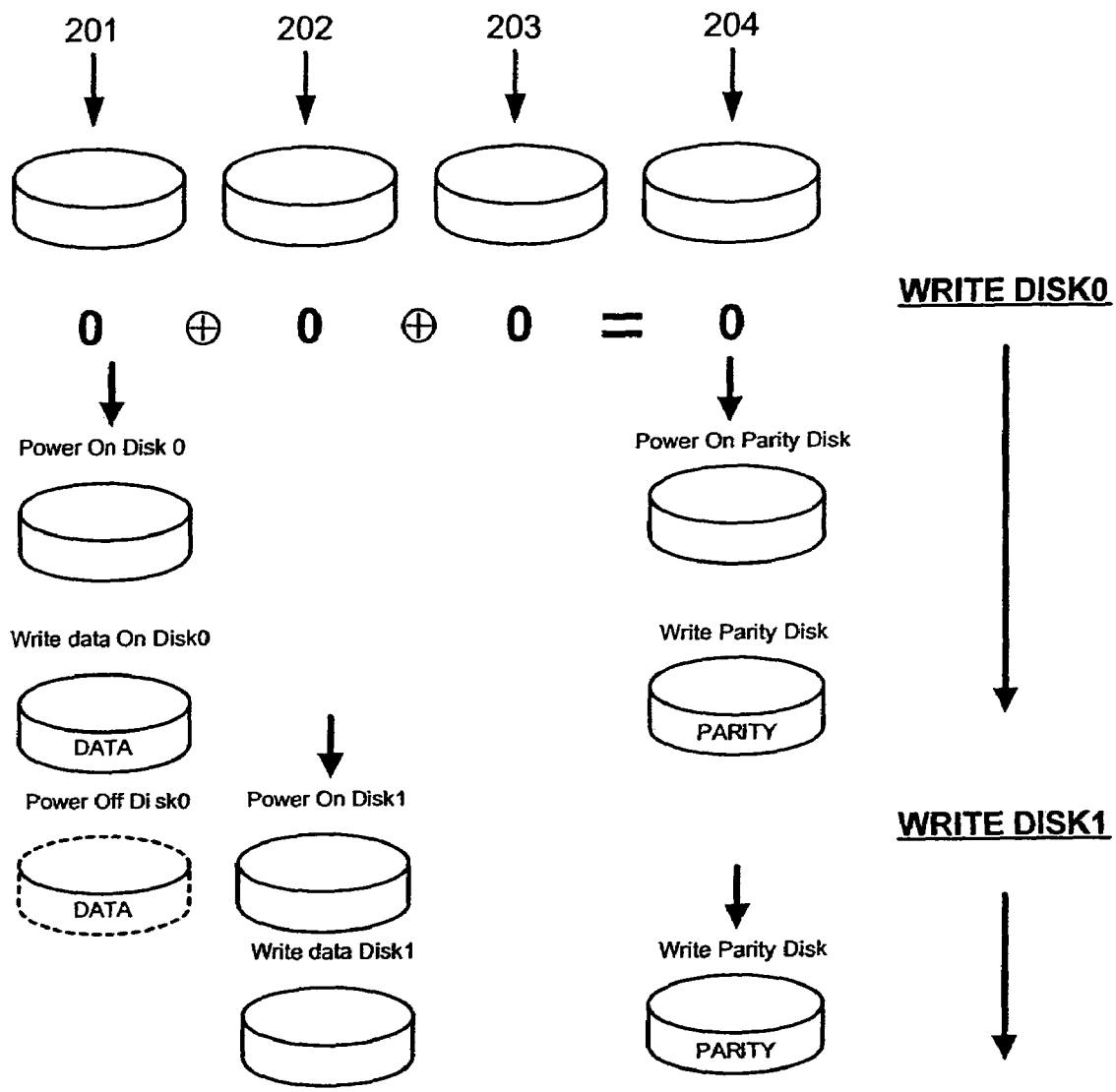
FIG. 5 is a diagram illustrating the manner in which information is written to a parity disk and the manner in which disk drives are powered on and off in accordance with one embodiment.

The presence of "zero-initialized" disk drives is used as the basis for creating a "rolling parity" update. For instance, referring to FIG. 5, in a set of 4 disk drives, 201–204, all drives (3 data and 1 parity) are initialized to "0". (It should be noted that the disk drives are arranged horizontally in the figure—each vertically aligned column represents a single disk at different points in time.) The result of the XOR computation denotes the result of the content of the parity drive ($0 \oplus 0 \oplus 0 = 0$). If data having a value of "5" is written to the first disk, 201, then the parity written to parity disk 204 would represent a "5" ($5 \oplus 0 \oplus 0 = 5$). If the next data disk (disk 202) were written with a value of "A", then the parity would be represented as "F" ($5 \oplus A \oplus 0 = F$). It should be noted that, while the parity disk contains a value equal to the XOR'ing of all three data disks, it is not necessary to power on all of the disks to generate the correct parity. Instead, the old parity ("5") is simply XOR'ed with the newly written data ("A") to generate the new parity ("F"). Thus, it is not necessary to XOR out the old data on disk 202.

Metadata Volume

In order to maintain the state and configuration of a given RAID set in one embodiment, there exists a "metadata volume" (MDV). This volume is a set of online, operational disk drives which may be mirrored for fault tolerance. This volume resides within the same domain as the set of disk drives. Thus, the operating environment should provide enough power, cooling, and packaging to support this volume. This volume contains metadata that is used for I/O operations and disk drive operational transitions (power up, power down, sparing, etc.). The data that resides on this volume is organized such that copies of subsets of data representing the data on the set of disk drives.

Figure 6:
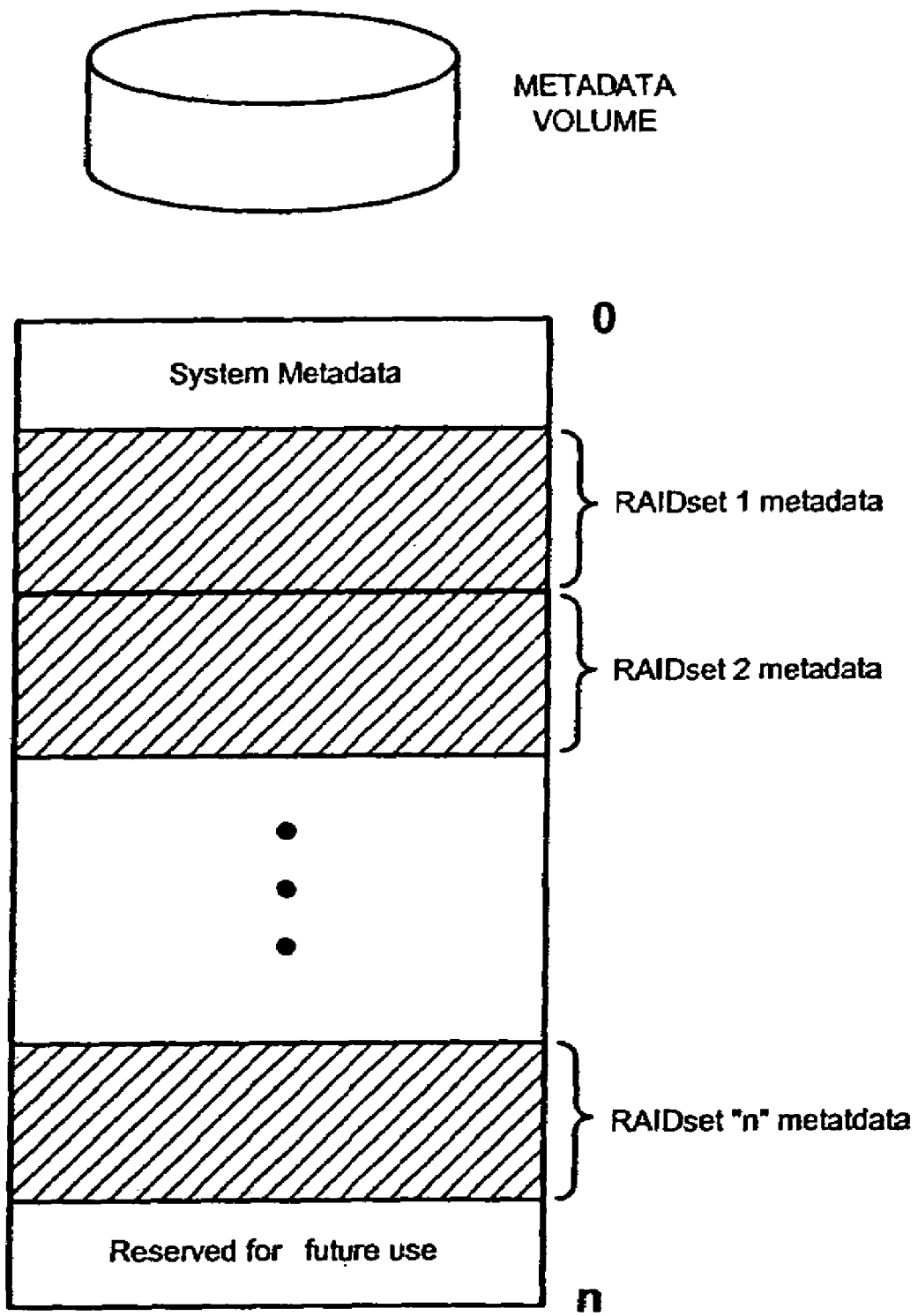
FIG. 6 is a diagram illustrating the content of a metadata disk in accordance with one embodiment.

In a preferred implementation, a metadata volume is located within each shelf corresponding to metadata for all data volumes resident on the disks in the shelf. Referring to FIGS. 6 and 7, the data content of a metadata volume is illustrated. This volume contains all the metadata for the shelf, RAID, disk and enclosure. There also exists metadata for the rack controller. This metadata is used to determine the correct system configuration between the rack controller and disk shelf.

In one embodiment, the metadata volume contains shelf attributes, such as the number of total drives, drive spares, unused data, RAID set attributes and memberships, such as the RAID set set, drive attributes, such as the serial number, hardware revisions, firmware revisions, and volume cache, including read cache and write cache.

Volume Configurations

In one embodiment, the metadata volume is a set of mirrored disk drives. The minimum number of the mirrored drives in this embodiment is 2. The number of disk drives in the metadata volume can be configured to match the level of protection requested by the user. The number of disks cannot exceed the number of disk controllers. In order to provide the highest level of fault tolerance within a disk shelf, the metadata volume is mirrored across each disk controller. This eliminates the possibility of a single disk controller disabling the Shelf Controller.

In order to provide the best performance of a metadata volume, dynamic re-configuration is enabled to determine the best disk controllers for which to have the disk drives operational. Also, in the event of a metadata volume disk failure, the first unallocated disk drive within a disk shelf will be used. Thus if there are no more unallocated disk drives, the first allocated spare disk drive will be used. If there are no more disk drives available, the shelf controller will remain in a stalled state until the metadata volume has been addressed.

Volume Layout

The layout of the metadata volume is designed to provide persistent data and state of the disk shelf. This data is used for shelf configuring, RAID set configuring, volume configuring, and disk configuring. This persistent metadata is updated and utilized during all phases of the disk shelf (Initialization, Normal, Reconstructing, Service, etc.).

The metadata volume data is used to communicate status and configuration data to the rack controller. For instance, the metadata may include "health information for each disk drive (i.e., information on how long the disk drive has been in service, how many times it has been powered on and off, and other factors that may affect its reliability). If the health information for a particular disk drive indicates that the drive should be replaced, the system may begin copying the data on the disk drive to another drive in case the first drive fails, or it may simply provide a notification that the drive should be replaced at the next normal service interval. The metadata volume data also has designated volume-cache area for each of the volumes. In the event that a volume is offline, the data stored in the metadata volume for the offline volume can be used while the volume comes online. This provides, via a request from the rack controller, a window of 10–12 seconds (or whatever time is necessary to power-on the corresponding drives) during which write data is cached while the drives of the offline volume are being powered up. After the drives are powered up and the volume is online, the cached data is written to the volume.

Shelf Initializations

At power-on/reset of the disk shelf, all data is read from the metadata volume. This data is used to bring the disk shelf to an operational mode. Once the disk shelf has completed the initialization, it will wait for the rack controller to initiate the rack controller initialization process.

Volume Operations

Once the disk shelf is in an operational mode, each volume is synchronized with the metadata volume. Each volume will have its associated set of metadata on the disk drive. This is needed in the event of a disastrous metadata volume failure.

Read Cache Operations

The metadata volume has reserved space for each volume. Within the reserved space of the metadata volume resides an allocated volume read cache (VRC). This read cache is designed to alleviate the spin-up and seek time of a disk drive once initiated with power. The VRC replicates the initial portion of each volume. The size of data replicated in the VRC will depend on the performance desired and the environmental conditions. Therefore, in the event that an I/O READ request is given to an offline volume, the data can be sourced from the VRC. Care must be taken to ensure that this data is coherent and consistent with the associated volume.

Write Cache Operations

As noted above, the metadata volume has reserved space for each volume. Within the reserved space of the metadata volume resides an allocated volume write cache (VWC). This write cached is designed to alleviate the spin-up and seek time of a disk drive once initiated with power. The VWC has a portion of the initial data, e.g., 512 MB, replicated for each volume. Therefore, in the event that an I/O write request is given to an offline volume, the data can be temporarily stored in the VWC. Again, care must be taken to ensure that this data is coherent and consistent with the associated volume.

Set of Disk I/O Operations

Figure 8:
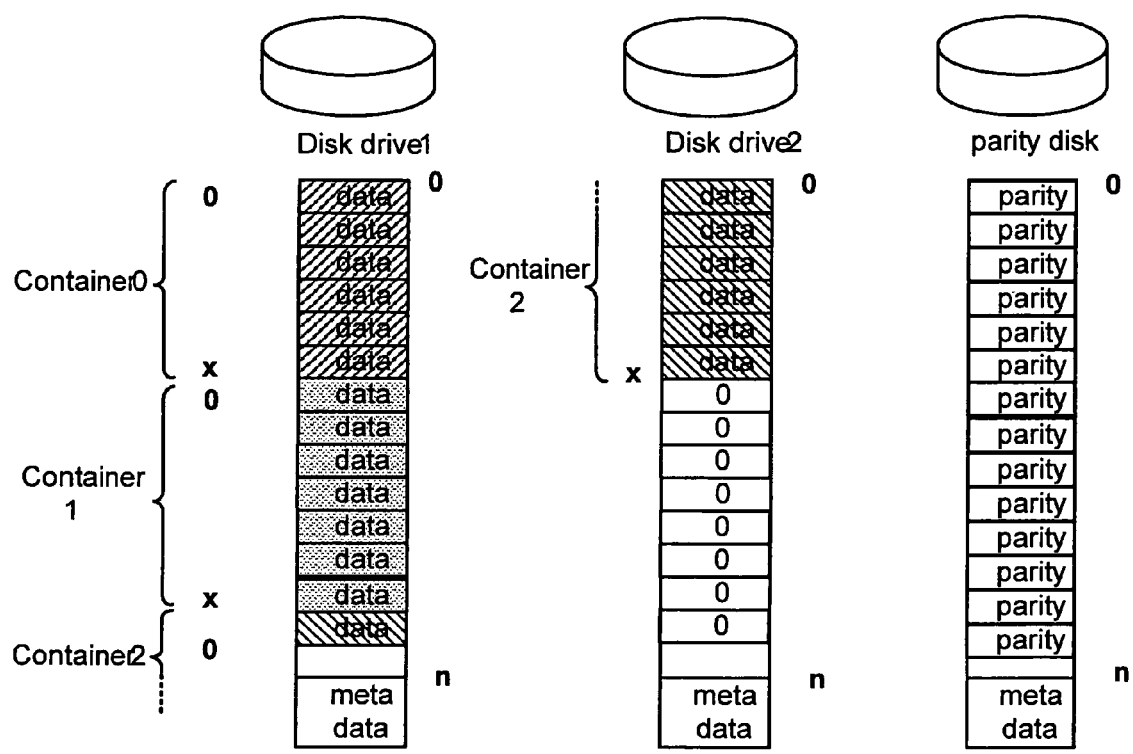
FIG. 8 is a diagram illustrating the manner in which containers of data are arranged on a set of disk drives in accordance with one embodiment.

Referring to FIG. 8, a diagram illustrating the manner in which data is stored on a set of disks is shown. A set of disks are partitioned into "large contiguous" sets of data blocks, known as containers. Single or multiple disk volumes which are presented to the storage user or server can represent a container. The data blocks within a container are dictated by the disk sector size, typically, 512 bytes. Each container is statically allocated and addressed from 0 to x, where x is the number of data blocks minus 1. Each container can be then divided into some number of sub-containers.

The access to each of the containers is through a level of address indirection. The container is a contiguous set of blocks that is addressed from 0 to x. As the device is accessed, the associated disk drive must be powered and operational. As an example, container 0 is fully contained within the address space of disk drive 1. Thus, when container 0 is written or read, the only disk drive that is powered on is disk drive 1.

Figure 9:
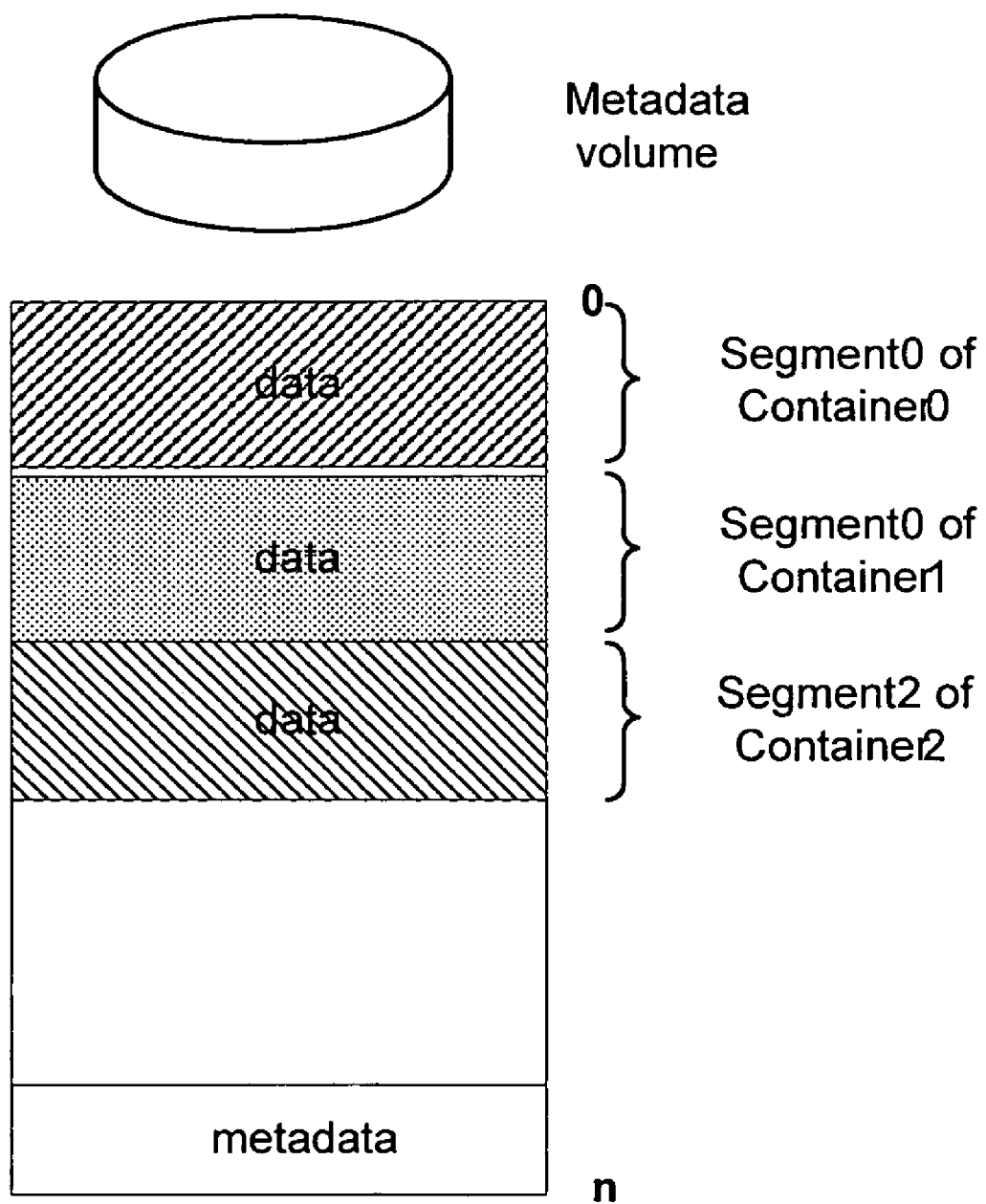
FIG. 9 is a diagram illustrating the manner in which the initial segments of data from a plurality of disk drives are stored on a metadata volume in accordance with one embodiment.

If there is a limited amount of power and cooling capacity for the system and only one disk drive can be accessed at a time, then in order to access container 2, disk drives 1 and 2 must be alternately powered, as container 2 spans both disk drives. Initially, disk drive 1 is powered. Then, disk drive 1 is powered down, and disk drive 2 is powered up. Consequently, there will be a delay for disk drive 2 to become ready for access. Thus, the access of the next set of data blocks on disk drive 2 will be delayed. This generally is not an acceptable behavior for access to a disk drive. The first segment of each disk drive and/or container is therefore cached on a separate set of active/online disk drives. In this embodiment, the data blocks for container 2 reside on the metadata volume, as illustrated in FIG. 9.

Figure 10:
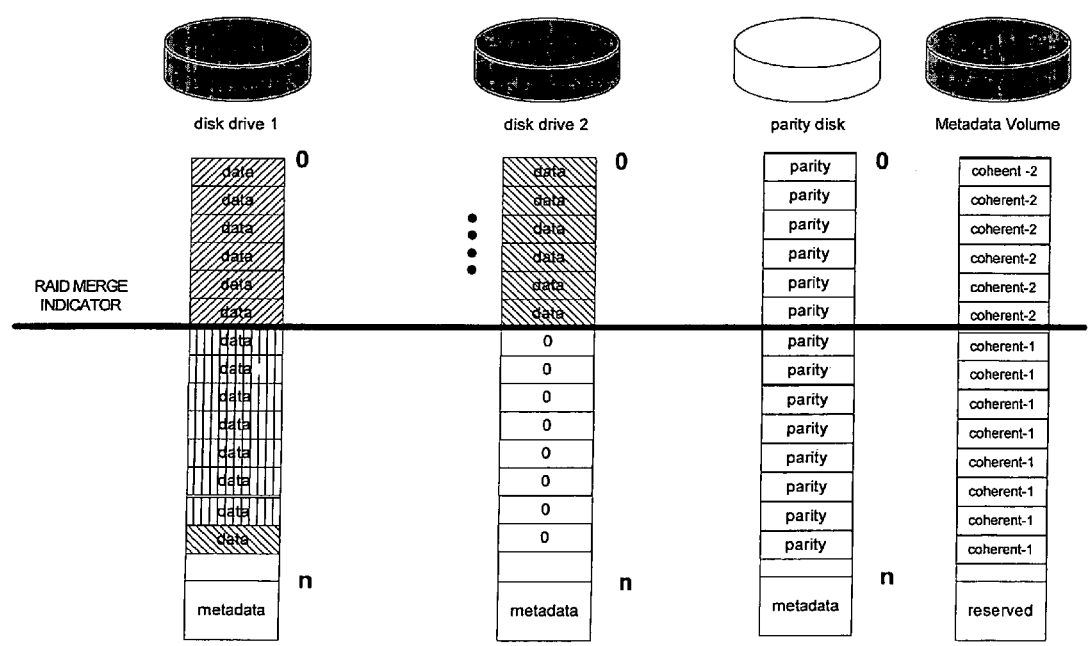
FIG. 10 is a diagram illustrating the use of a pair of redundant disk drives and corresponding parity and metadata volumes in accordance with one embodiment.

This technique, in which a transition between two disk drives is accomplished by powering down one disk drive and powering up the other disk drive, can be applied to more than just a single pair of disk drives. In the event that there is a need for higher bandwidth, the single drives described above can each be representative of a set of disk drives. This disk drive configuration could comprise RAID10 or some form of data organization that would "spread" a hot spot over many disk drives (spindles). Set of Disk Drives becoming Redundant Referring to FIG. 10, a diagram illustrating the use of a pair of redundant disk drives is shown. As data is allocated to a set of disk drives, there is a need for data replication. Assuming that the replication is a form of RAID (1, 4, 5, etc.), then the process of merging must keep the data coherent. This process may be done in synchronously with each write operation, or it may be performed at a later time. Since not all disk drives are powered on at one time, there is additional housekeeping of the current status of a set of disk drives. This housekeeping comprises the information needed to regenerate data blocks, knowing exactly which set of disk drives or subset of disk drives are valid in restoring the data.

Variable RAID Set Membership

One significant benefit of the power-managed system described herein is that drives in a RAID set can be reused, even in the event of multiple disk drive failures. In conventional RAID systems, failure of more than one drive in a RAID set results in the need to abandon all of the drives in the RAID set, since data is striped or distributed across all of the drives in the RAID set. In the case of the power-managed system described herein, it is possible to reuse the remaining drives in a different RAID set or a RAID set of different size. This results in much greater utilization of the storage space in the total system.

In the event of multiple drive failures in the same RAID set, the set of member drives in the RAID set can be decreased (e.g., from six drives to four). Using the property of "zero-based" XOR parity as described above, the parity for the reduced set of drives can be calculated from the data that resides on these drives. This allows the preservation of the data on the remaining drives in the event of future drive failures. In the event that the parity drive is one of the failed drives, a new parity drive could be designated for the newly formed RAID set, and the parity information would be stored on this drive. Disk drive metadata is updated to reflect the remaining and/or new drives that now constitute the reduced or newly formed RAID set.

In one exemplary embodiment, a RAID set has five member drives, including four data drives and one parity drive. In the event of a failure of one data drive, the data can be reconstructed, either on the remaining disk drives if sufficient space is available. (If a spare is available to replace the failed drive and it is not necessary to reduce the RAID set, the data can be reconstructed on the new member drive.) In the event of a simultaneous failure of two or more data drives, the data on the non-failed drives can be retained and operations can proceed with the remaining data on the reduced RAID set, or the reduced RAID set can be re-initialized and used as a new RAID set.

This same principle can be applied to expand a set of disk drives. In other words, if it would be desirable to add a drive to a RAID set (e.g., increasing the set from four drives to five), this can also be accomplished in a manner similar to the reduction of the RAID set. In the event a RAID set would warrant an additional disk drive, the disk drive metadata would need to be updated to represent the membership of the new drive(s).

Sparing of a Set of Disk Drives

The sparing of a failed disk on of a set of disk drives is performed at both failed data block and the failed disk drive events. The sparing of failed data blocks is temporarily regenerated. Using both the metadata volume and a 'spare' disk drive, the process of restoring redundancy within a set of disk drives, can be more efficient and effective. This process is matched to the powering of the each of the remaining disk drives in a set of disk drives.

In the event of an exceeded threshold for failed data blocks, a spare disk drive is allocated as a candidate for replacement into the RAID set. Since only a limited number of drives can be powered-on at one time, only the drive having the failed data blocks and the candidate drive are powered. At this point, only the known good data blocks are copied onto the corresponding address locations of the failed data blocks. Once all the known good blocks have been copied, the process to restore the failed blocks is initiated. Thus the entire RAID set will need to be powered-on. Although the entire set of disk drives needs to powered-on, it is only for the time necessary to repair the bad blocks. After all the bad blocks have been repaired, the drives are returned to a powered-off state.

In the event of a failed disk drive, all disk drives in the RAID set are powered-on. The reconstruction process, discussed in the previous section, would then be initiated for the restoration of all the data on the failed disk drive.

RAID Automated Storage Management Features

Figure 11:
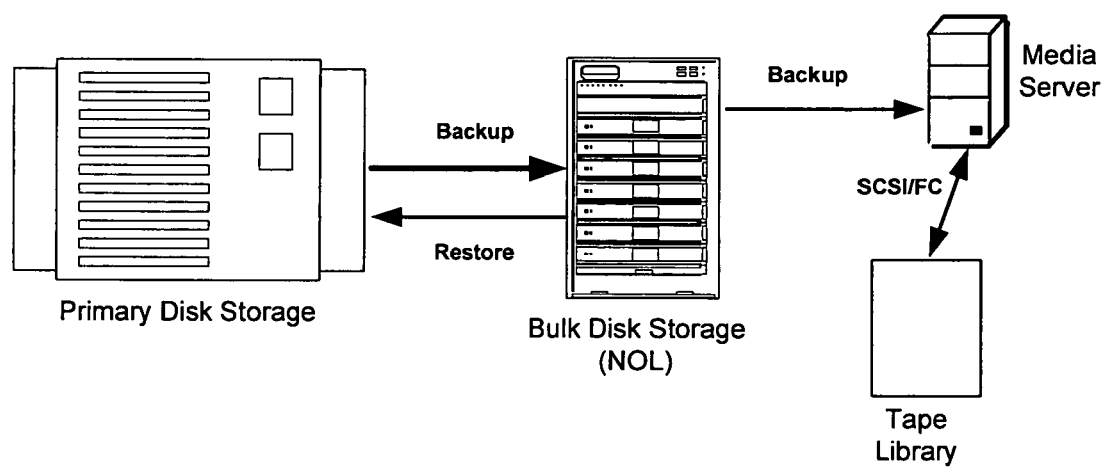
FIG. 11 is a diagram illustrating the use of a data storage system as a backup target for the primary storage via a direct connection and as a media (backup) server to a tape library in accordance with one embodiment.

The end user of the system may use it, for example, as a disk system attached directly to a server as direct attached storage (DAS) or as shared storage in a storage area network (SAN). In FIG. 11, the system is used as the backup target to the primary storage via a direct connection and then connected via a media (backup) server to a tape library. The system may be used in other ways in other embodiments.

In this embodiment, the system presents volume images to the servers or users of the system. However, physical volumes are not directly accessible to the end users. This is because, as described earlier, through the power managed RAID, the system hides the complexity of access to physical drives, whether they are powered on or not. The controller at the rack and the shelf level isolates the logical volume from the physical volume and drives.

Given this presentation of the logical view of the disk volumes, the system can rewrite, relocate or move the logical volumes to different physical locations. This enables a number of volume-level functions that are described below. For instance, the system may provide independence from the disk drive type, capacity, data rates, etc. This allows migration to new media as they become available and when new technology is adopted. It also eliminates the device (disk) management administration required to incorporate technology obsolescence.

The system may also provide automated replication for disaster recovery. The second copy of a primary volume can be independently copied to third party storage devices over the network, either local or over wide-area. Further, the device can be another disk system, another tape system, or the like. Also, the volume could be replicated to multiple sites for simultaneously creating multiple remote or local copies.

The system may also provide automatic incremental backup to conserve media and bandwidth. Incremental and differential changes in the storage volume can be propagated to the third or later copies.

The system may also provide authentication and authorization services. Access to both the physical and logical volumes and drives can be controlled by the rack and shelf controller since it is interposed between the end user of the volumes and the physical drives.

The system may also provide automated data revitalization. Since data on disk media can degrade over time, the system controller can refresh the volume data to different drives automatically so that the data integrity is maintained. Since the controllers have information on when disks and volumes are written, they can keep track of which disk data has to be refreshed or revitalized.

The system may also provide concurrent restores: multiple restores can be conducted concurrently, possibly initiated asynchronously or via policy by the controllers in the system. The restore restores the data in a disk drive from other disk drives.

The system may also provide unique indexing of metadata within a storage volume: by keeping metadata information on the details of objects contained within a volume, such as within the metadata volume in a shelf. The metadata can be used by the controller for the rapid search of specific objects across volumes in the system.

The system may also provide other storage administration feature for the management of secondary and multiple copies of volumes, such as single-view of all data to simplify and reduce cost of managing all volume copies, automated management of the distribution of the copies of data, and auto-discovery and change detection of the primary volume that is being backed up When the system is used for creating backups.

A Preferred Implementation

Interconnect

Figure 12:
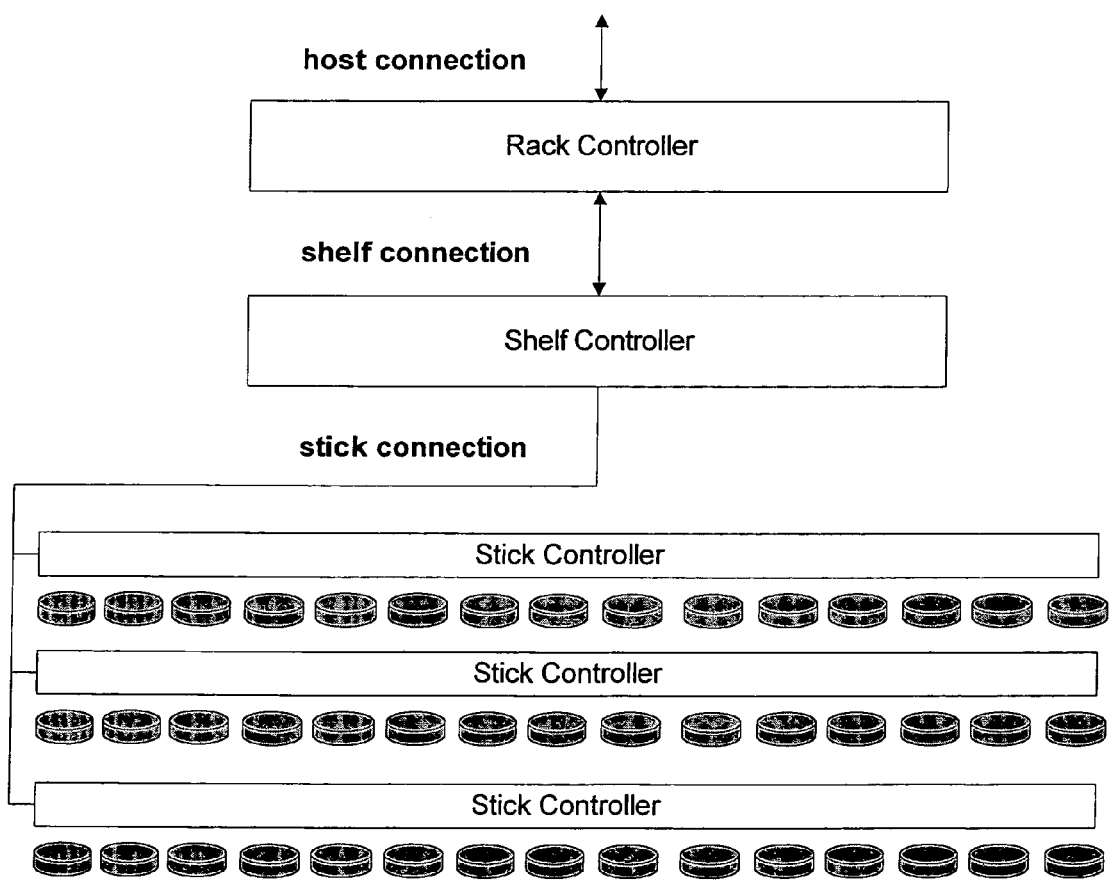
FIG. 12 is a diagram illustrating the interconnect from the host (server or end user) to the end disk drives in accordance with one embodiment.

The preferred interconnect system provides a means to connect 896 disk drives, configured as 112 disks per shelf and 8 shelves per rack. The internal system interconnect is designed to provide an aggregate throughput equivalent to six 2 Gb/sec Fibre Channel interfaces (1000 MB/s read or write). The external system interface is Fibre Channel. The interconnect system is optimized for the lowest cost per disk at the required throughput. FIG. 12 shows the interconnect scheme from the host (server or end user) to the end disk drives.

The interconnect system incorporates RAID at the shelf level to provide data reliability. The RAID controller is designed to address 112 disks, some of which may be allocated to sparing. The RAID controller spans 8 sticks of 14 disks each. The RAID set should be configured to span multiple sticks to guard against loss of any single stick controller or interconnect or loss of any single disk drive.

The system interconnect from shelf to stick can be configured to provide redundancy at the stick level for improved availability.

The stick-level interconnect is composed of a stick controller (FPGA/ASIC plus SERDES), shelf controller (FPGA/ASIC plus SERDES, external processor and memory), rack controller (FPGA/ASIC plus SERDES) and associated cables, connectors, printed circuit boards, power supplies and miscellaneous components. As an option, the SERDES and/or processor functions may be integrated into an advanced FPGA (e.g., using Xilinx Virtex II Pro).

Shelf and Stick Controller

Figure 13:
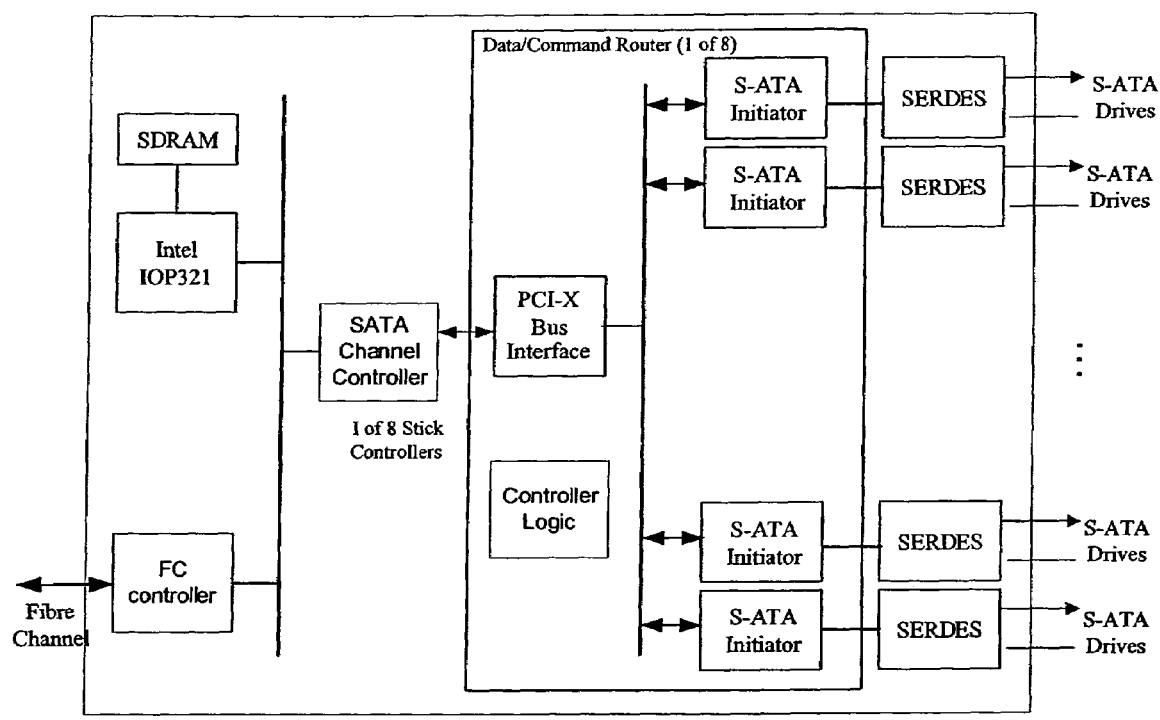
FIG. 13 is a diagram illustrating the interconnection of a channel controller with multiple stick controllers in accordance with one embodiment.
Figure 15:
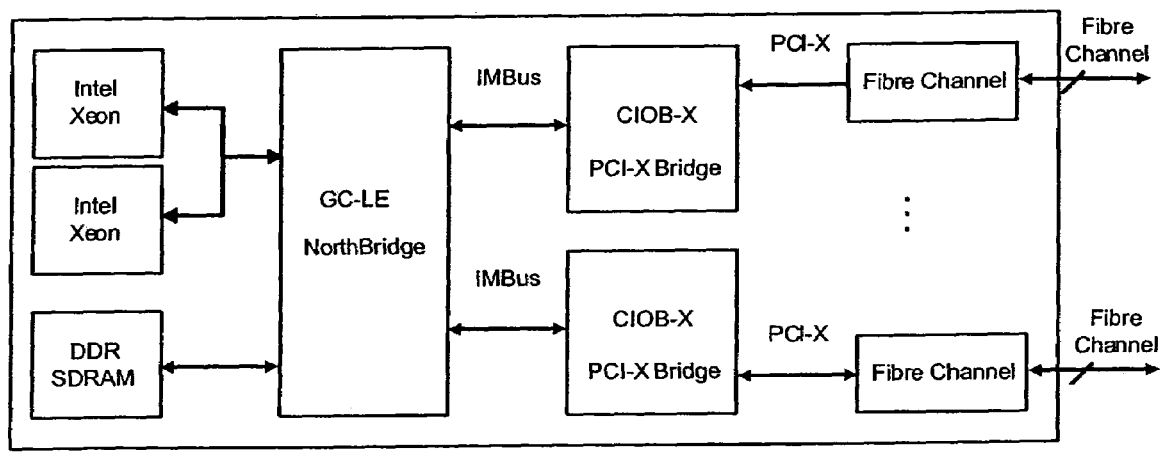
FIG. 15 is a diagram illustrating the implementation of a rack controller in accordance with one embodiment.

The shelf controller and the associated 8 stick controllers are shown in FIG. 13. In this implementation, the shelf controller is connected to the rack controller (FIG. 15) via Fibre Channel interconnects. It should be noted that, in other embodiments, other types of controllers and interconnects (e.g., SCSI) may be used.

The shelf controller can provide different RAID level support such as RAID 0, 1 and 5 and combinations thereof across programmable disk RAID sets accessible via eight SATA initiator ports. The RAID functions are implemented in firmware, with acceleration provided by an XOR engine and DMA engine implemented in hardware. In this case, XOR-equipped CPU Intel IOP321 is used.

Figure 14:
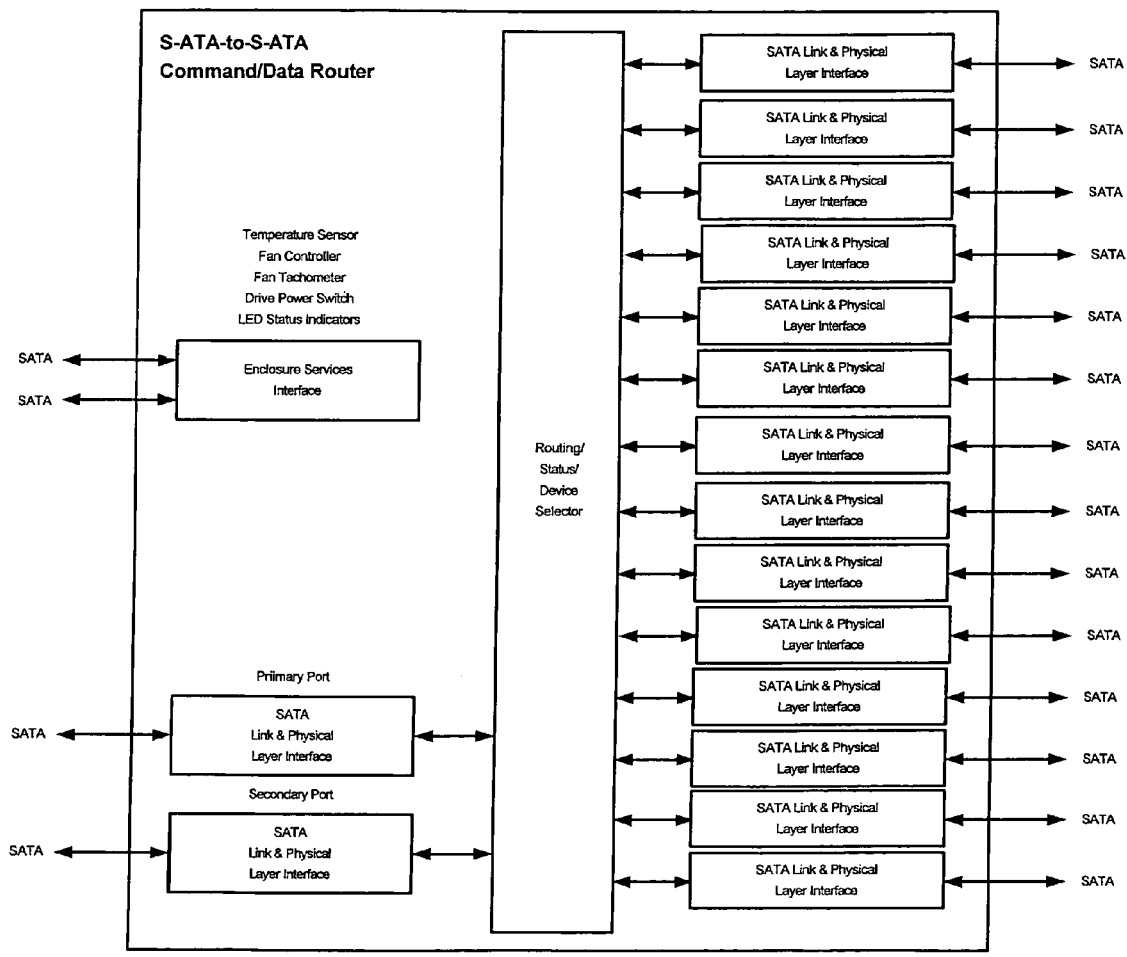
FIG. 14 is a diagram illustrating the interconnection of the outputs of a SATA channel controller with corresponding stick controller data/command router devices in accordance with one embodiment.

The Shelf Controller RAID control unit connects to the Stick Controller via a SATA Channel Controller over the PCI-X bus. The 8 SATA outputs of the SATA Channel Controller each connect with a stick controller data/command router device (FIG. 14). Each data/command router controls 14 SATA drives of each stick.

Rack Controller

The rack controller comprises a motherboard with a ServerWorks GC-LE chipset and four to 8 PCI-X slots. In the implementation shown in FIG. 15, the PCI-X slots are populated with dual-port or quad-port 2G Fibre Channel PCI-X target bus adapters (TBA). In other embodiments, other components, which employ other protocols, may be used. For example, in one embodiment, quad-port shelf SCSI adapters using u320 to the shelf units may be used.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
a plurality of data storage drives; and
a controller coupled to each of the data storage drives;
wherein the controller is configured to power on a first subset of the data storage drives and to power down a second subset of the data storage drives, and wherein single set of data storage drives in the plurality of data storage drives includes a powered down data storage drive from the second subset and a powered on data storage drive from the first subset.

2. The system of claim 1, wherein the plurality of data storage drives comprise a single RAID set of data storage drives.

3. The system of claim 1, wherein the first subset comprises at least one data storage drive in a first RAID set and the second subset comprises at least one data storage drive in the first RAID set.

4. The system of claim 1, wherein each of the plurality of data storage drives is individually controllable to power the data storage drive on or down, independent of the remainder of the plurality of data storage drives.

5. The system of claim 1, wherein the data storage drives comprise hard disk drives.

6. The system of claim 5, wherein the system comprises a RAID system.

7. The system of claim 5, wherein the system comprises multiple shelves, each shelf including a number of data storage drives in an enclosure, wherein first shelf in the multiple shelves includes the powered down data storage drive in the first subset and powered down data storage drive from the second subset.

8. The system of claim 7, wherein the system comprises one or more RAID sets of data storage drives and wherein each of the one or more RAID sets of data storage drives comprises data storage drives from at least two of the shelves.

9. The system of claim 7, wherein the controller comprises a rack controller connected to a plurality of shelf controllers, wherein each shelf controller is configured to control a set of data storage drives on a corresponding shelf.

10. The system of claim 1, wherein the data storage drives are contained in a single physical enclosure.

11. The system of claim 1, wherein the data storage drives comprise optical disk drives.

12. The system of claim 1, further comprising one or more parity drives, each of which is associated with a corresponding RAID set of the plurality of data storage drives.

13. The system of claim 12, wherein the system is configured to compute parity information for the RAID set by XOR'ing an old parity value with a value currently written to one of the data storage drives in the RAID set to generate a current parity value, and storing the current parity value on the parity drive.

14. The system of claim 12, wherein the one or more parity drives are always powered on.

15. The system of claim 1, further comprising one or more metadata drives, each of which is associated with a corresponding group of the plurality of data storage drives.

16. The system of claim 15, wherein the system is configured to store metadata information on the metadata drive, wherein the metadata comprises a mapping of logical addresses for the system to physical addresses for the corresponding group of data storage drives.

17. The system of claim 15, wherein the system is configured to store metadata information on the metadata drive, wherein the metadata comprises health information for the corresponding group of data storage drives.

18. The system of claim 15, wherein the system is configured to store metadata information on the metadata drive, wherein the metadata comprises data which duplicates a portion of each of the corresponding group of data storage drives.

19. The system of claim 15, wherein the one or more metadata drives are always powered on.

20. The system of claim 1, wherein the first subset comprises no more than a predetermined fraction of the plurality of data storage drives.

21. The system of claim 1, wherein the predetermined fraction is determined based on a failure rate of individual data storage drives, a minimum required service period, and a total number of data storage drives in the system.

22. The system of claim 21, wherein the predetermined fraction is equal to $f/\{1-(1-1/T)[[** 1/N]]^{1/N}\}$, where f is a mean time between failures of an individual data storage drive, T is a minimum required service period, and N is the total number of data storage drives in the system.

23. A method comprising:
providing a data storage system having a plurality of data storage drives;
performing data accesses to the data storage system, wherein the data accesses involve accesses to a first subset of the data storage drives, wherein the first subset of the data storage drives is powered on; and
powering down a second subset of the data storage drives, wherein the data accesses do not involve accesses to the second subset of the data storage drives,
wherein a single set of data storage drives in the plurality of data storage drives includes a powered down data storage drive from the second subset and a powered on data storage drive from the first subset.

24. The method of claim 23, wherein the plurality of data storage drives comprise a single RAID set of data storage drives.

25. The method of claim 23, wherein the first subset comprises at least one data storage drive in a first RAID set and the second subset comprises at least one data storage drive in the first RAID set.

26. The method of claim 23, wherein each of the plurality of data storage drives is individually controlled to power the data storage drive on or down, independent of the remainder of the plurality of data storage drives.

27. The method of claim 23, wherein performing data accesses to the data storage system comprises accessing a block of storage that spans a first data storage drive and a second data storage drive, wherein as the first data storage drive is accessed, the first data storage drive is powered on and the second data storage drive is powered down, and as the second data storage drive is accessed, the second data storage drive is powered on and the first data storage drive is powered down.

28. The method of claim 27, further comprising, if the data accesses comprise writes, caching data for the second data storage drive as the second data storage drive is transitioned from a powered down state to a powered on state.

29. The method of claim 27, further comprising, if the data accesses comprise reads, retrieving data corresponding to the second data storage drive from a metadata volume as the second data storage drive is transitioned from a powered down state to a powered on state.

30. The method of claim 23, wherein performing data accesses to the data storage system comprises accessing one or more data storage drives and corresponding parity drives.

31. The method of claim 30, further comprising computing parity information for a RAID set by XOR'ing an old parity value with a value currently written to one of the data storage drives in the RAID set to generate a current parity value, and storing the current parity value on the parity drive.

32. The method of claim 23, wherein performing data accesses to the data storage system comprises accessing one or more data storage drives and corresponding metadata drives.

33. The method of claim 32, wherein accessing the metadata drives comprises storing metadata information on the metadata drive, wherein the metadata comprises health information for the corresponding group of data storage drives.

34. The method of claim 32, wherein accessing the metadata drives comprises storing metadata information on the metadata drive, wherein the metadata comprises data which duplicates a portion of each of the corresponding group of data storage drives.

35. The method of claim 32, further comprising refreshing data on the one or more data storage drives by moving data to different data storage drives to maintain integrity based on information stored on the metadata drive.

36. The method of claim 23, wherein the first subset comprises no more than a predetermined fraction of the plurality of data storage drives.

37. The system of claim 36, wherein the predetermined fraction is determined based on a failure rate of individual data storage drives, a minimum required service period, and a total number of data storage drives in the system.

38. The method of claim 37, wherein the predetermined fraction is equal to $f/\{1-(1-1/T)[[**1/N]]^{1/N}\}$, where f is a mean time between failures of an individual data storage drive, T is a minimum required service period, and N is the total number of data storage drives in the system.

39. The method of claim 23, further comprising replacing one or more data storage drives that are in the second subset.

* * * * *